United States Patent [19]

Benczur-Urmossy et al.

[11] 4,051,305
[45] Sept. 27, 1977

[54] ELECTRODES FOR GALVANIC ELEMENTS

[75] Inventors: Gabor Benczúr-Urmössy, Stuttgart; Ute Baumeyer, Rommelshausen, both of Germany

[73] Assignee: Deutsche Automobilgesellschaft m.b.H., Germany

[21] Appl. No.: 475,175

[22] Filed: May 31, 1974

[30] Foreign Application Priority Data

June 1, 1973 Germany .............................. 2327931

[51] Int. Cl.² .......................... H01M 4/52; B22F 9/00
[52] U.S. Cl. .................................... 429/217; 429/221; 429/223; 75/.5 AA
[58] Field of Search ....................... 136/28, 29, 24, 25, 136/120 R; 75/.5 AA; 429/217, 221, 223

[56] References Cited

U.S. PATENT DOCUMENTS

| 2,597,701 | 5/1952 | Beller ................................ 75/.5 AA |
| 2,726,951 | 12/1955 | Ramsay et al. .................... 75/.5 AA |
| 2,737,541 | 3/1956 | Coolidge .......................... 136/25 X |
| 2,794,735 | 6/1957 | Schlecht et al. .................. 136/28 X |
| 3,023,259 | 2/1962 | Coler et al. ....................... 136/28 X |
| 3,060,254 | 10/1962 | Urry .................................. 136/24 |
| 3,918,955 | 11/1975 | Llewelyn .......................... 75/.5 AA |

FOREIGN PATENT DOCUMENTS

| 832,318 | 4/1960 | United Kingdom |
| 832,317 | 4/1960 | United Kingdom |

Primary Examiner—Anthony Skapars
Attorney, Agent, or Firm—Craig & Antonelli

[57] ABSTRACT

Electrodes for galvanic elements which contain an active mass and an electrocatalyst, an organic binding agent and a conductive substance which also contributes simultaneously to the mechanical rigidity; as conductive substance is used the voluminous material obtained by thermal decomposition of nickel- or/and iron-carbonyl in the presence of an inert gas that is not preheated.

27 Claims, 1 Drawing Figure

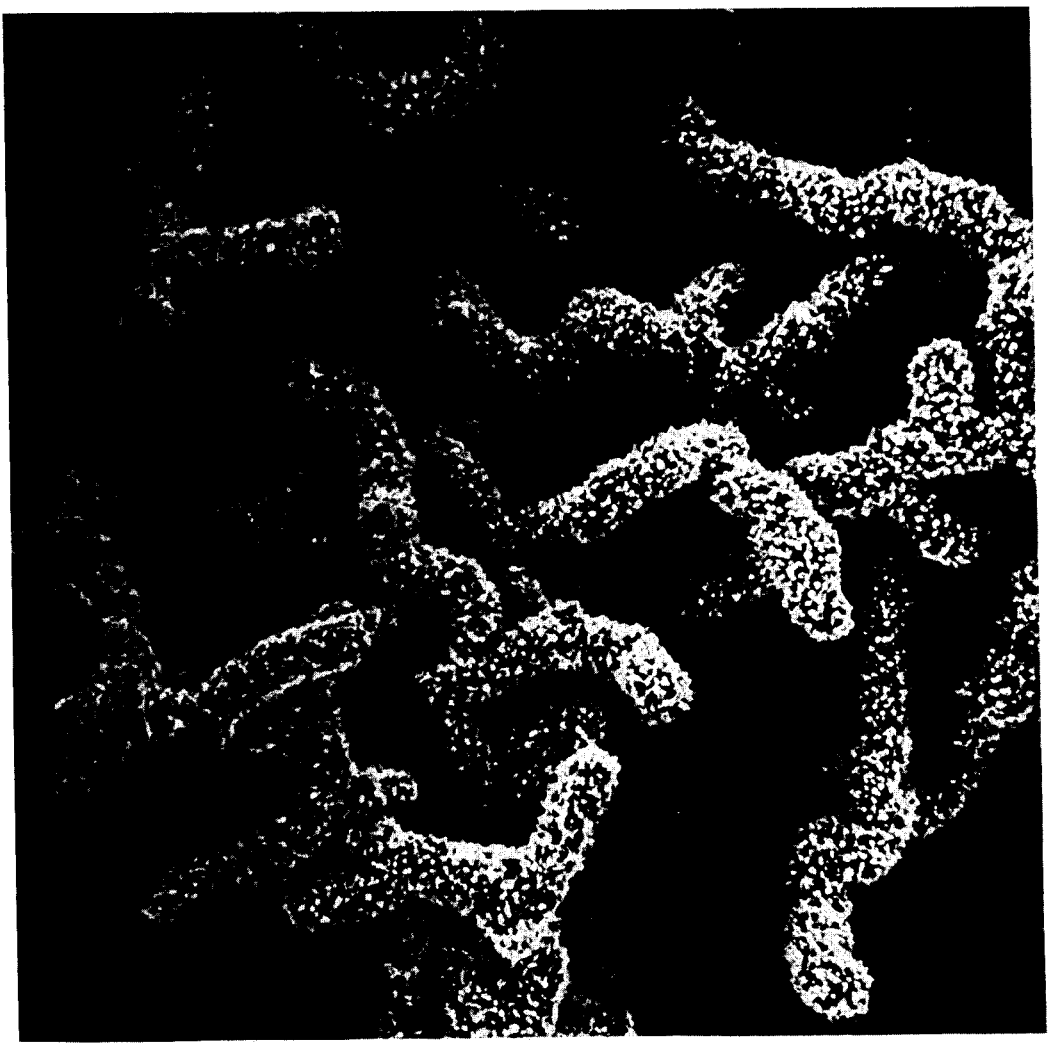

ELECTRODES FOR GALVANIC ELEMENTS

The present invention relates to electrodes for galvanic elements with alkaline electrolytes.

In electrodes for galvanic elements, the active mass participating in the electrochemical reaction or the electrocatalytically active mass is in close contact with a large surface, electronically conductive material which enables the inflow and outflow (discharge) of electrons depending on the direction of the discharge or charging process. The electronically conductive material which will be referred to hereinafter as conductive substance, may serve exclusively for the discharge of the electrons, or may also itself be converted at its surface into an active mass; these two functions of the conductive substance become quite apparent from the example of nickel-oxide tube electrodes which customarily contain both graphite as inert conductive material and also nickel flakes as material partaking the cell reaction. Furthermore, the conductive substance may also assume a supporting function if it is sintered together into an electrode support structure. Such sintered support structures or frameworks which are subsequently impregnated with an active mass, are known, for example, for nickel oxide electrodes and iron electrodes.

As compared to the classical tubular electrodes or pocket plate electrodes, electrodes with sintered structures offer the advantage of being able to be subjected to higher mechanical loads and of better utilization of the active mass, however, they are expensive to manufacture.

One has therefore made an effort to arrive at electrodes that are more favorable from a cost point of view, in that one combined the particles of the conductive substance with each other and with the current lead-off conductor, not by sintering, but by organic binding agents, for example, the thermoplastics; by the term "current lead-off conductor" or simply "current conductor" is understood the mechanically rigid metal part which electrically conductively connects each electrode with the terminals of the battery and which, depending on the type of construction of the electrode, may be present as grid, wire, sheet metal plate, etc., but does not possess the characteristically large surface of the conductive substance. In electrodes with synthetic plastic binding, the current (lead-off) conductor is constructed frequently as meshwork over the entire electrode surface and imparts form and rigidity to the electrode; the electrode body, properly speaking, gains its cohesion by the spatial interlacing of the conductive substance with the binding agent. The quantity of the binding agent is thereby normally so selected that a sufficiently large number of contacts of the particles of the conductive substance with each other exists in order to assure the required conductivity of the electrode body.

The manufacture is simple and therefore inexpensive in that the active mass, or electrocatalyst and the binding agent are mixed with each other and are applied onto the current lead-off conductor by rolling or pressing action, possibly while heating the mixture. The porosity of the electrode body can be adjusted by the amount of applied pressure, the pressing duration, the temperature or by admixture of a conventional pore forming material which is dissolved out after the manufacture of the electrode. A modification of such known method consists in coating the conductive substance with the active mass or with the electrocatalyst and then to harden or solidify the same with the binding agent. The binding agent, in addition to being admixed in solid form, may also be admixed in liquid form, i.e., as solution, dispersion or melt, whereby a solvent has to be evaporated out during or after the mixing operation.

The technique of the synthetic plastic binding or bonding of electrodes has found at first its acceptance in the fuel cell technique because it permits the manufacture of very thin electrodes and because some binding agents frequently possess at the same time desired hydrophobic characteristics. However, also iron- and nickel-oxide electrodes for secondary batteries are known in the art which have been pressed or rolled with the use of organic binding agents. In addition to graphite powder, iron or nickel powder was used as conductive substance, depending on the type of the electrode.

Graphite powder thereby entails the disadvantage that it does not attain the good conductivity of the metals and is gradually irreversibly oxidized in positive electrodes. Nickel- and iron-powder, as they are used as conductive substances in electrodes bonded by synthetic plastic materials, by reason of their ball-shaped or approximately ball-shaped particle form (with particle diameters which in each direction lie between 3 and 7 $\mu$m) provide a sufficiently large number of contacts and therewith good conductivity only with a high degree of space filling with small intermediate spaces or interstices.

It is the aim of the present invention to provide a conductive substance particularly suitable for electrodes with organic binding agents, which forms in the mixture with the binding agent and with the active mass a spatially extensive, wide meshwork with many contact points and thus with a high conductivity and which contributes to an increased extent to the rigidity of the electrode.

The underlying problems are solved according to the present invention in that the voluminous material formed by thermal decomposition of nickel or iron carbonyl in the presence of an inert gas is used as conductive substance.

It is known to thermally decompose nickel carbonyl or iron carbonyl into powder and to utilize this powder, inter alia, also in battery electrodes. The known thermal decomposition takes place in that either the carbonyl in the undiluted condition is heated to the decomposition temperature or in that inert gases preheated to the decomposition temperature are admixed which effect the decomposition and supply the calories necessary therefor. A very fine power is produced thereby. However, it has now been discovered surprisingly that the thermal decomposition of the carbonyls in the presence of inert gases which are not preheated, does not lead to a powder but to a loosely cohesive, larg-volume (voluminous), moss-like material of fiber-shaped crystal aggregates. As will be described hereinafter by reference to the example, for instance, nickel- and iron-carbonyl is thereby evaporated by heating the same to a temperature of about 70° and about 55° C., respectively, and the thus obtained gas is mixed with normal nitrogen which is appropriately removed from a pressurized gas cylinder or from any other pressure container and which has normal room temperature. This is also true for the other inert gases. This gas mixture is then conducted under normal pressure to the decomposition space heated to the decomposition temperature in which the thermal decomposition takes place. Without being bound to any particular theory, it is assumed that it involves a wall reaction which permits the growth of the nickel crystals one on the other into a voluminous product which looks like a moss-like structure of felted or matted (interlocked), fibrous or thread-like crystals grown one upon the other. This product differs basically in appearance and in properties from smooth nickel, sintered nickel or nickel powder.

The single FIGURE is an enlarged picture of a nickel moss of the present invention, enlarged 500 times.

The product of this thermal decomposition of nickel carbonyl in accordance with the present invention is illustrated in the single FIGURE of the drawing. This FIGURE is a photograph of nickel moss taken with an electron scan microscope at an enlargement of 500 times and illustrates clearly the moss-like felted (interlocked) structure of the fiber-like grown nickel. Whereas nickel powder consists of round granules, the growth of nickel with the voluminous material, as is used herein, takes place above all in one dimension.

By reason of its fibrous or thread-shaped felted structure, this material is suited excellently as conductive substance in electrodes bonded together by synthetic resinous agents. These electrodes may be both catalyst electrodes for the reaction or conversion of fuel or oxidizing agents, such as hydrogen- or air-electrodes, as also electrodes in primary elements or electrodes in secondary batteries, such as iron-, cobalt- or hydrogen-accumulator anodes, or, for example, nickel oxide cathodes, insofar as only nickel or iron can be used as conductive substance in the respective type of electrode.

Preferably, nitrogen, a rare gas, or carbon dioxide is used as inert gas in the thermal decomposition of the carbonyls. The gaseous carbonyl is mixed, for example, wint nitrogen at a ratio of 1: 1 up to about 1: 100 and is preferably processed in the mixing range of about 1: 15 to about 1: 30. Similar ranges may be used with the other inert gases.

Preferably the thermal decomposition of the carbonyls takes place in a flowing gas mixture. It is thereby possible by a suitable selection of the flow velocity and/or of the flow quantity to influence the structure of the obtained voluminous material; such an influence is possible also by changing the concentration of the carbonyl in the gas mixture, by changing the gas pressure and/or the temperature.

Appropriately, the gas mixture is conducted through a pipe heated to about 300° to about 500° C. whereby obstacles are provided in this pipe, preferably in the flow direction; appropriately cross-sectional interconnections and/or insert bodies are provided as obstructions whereby according to the present invention, the insert bodies consist of reaction product and in particularly are heated up.

Insert bodies made from reaction product are particularly preferred and they are produced automatically during the decomposition reaction, if one leaves the formed voluminous decomposition product within the decomposition space for a certain period of time. More particularly, as soon as the reaction has commenced and the moss-like decomposition product of carbonyl is present in the reaction space, the product of the further decomposition grows on the already present moss-like metal product consisting of matted (interlocked) fibers and thus forms ever larger structures of metal moss, whereby the growth of the fiber shaped crystal aggregates takes place hardly in thickness and practically only in length. In practice, one thus leaves the reaction product in the heated decomposition space until the latter is far-reachingly filled by the voluminous reaction product and then removes the formed product, for example, by ejection out of the decomposition pipe by means of a piston. Since the decomposition space is continuously heated to the decomposition temperature, the thus formed insert bodies are also constantly heated correspondingly.

Appropriately, one operates with a heating zone travelling opposite the flow direction.

The voluminous material, in the case of the decomposition or iron carbonyl, is preferably subjected after its production to a heat treatment thereof which eliminates a possibly present pyrophoric character of the material and takes place under a protective gas or in vacuum at a temperature of preferably about 500° C.

Prior to the further processing, particularly again for the decomposition product of the iron carbonyl, a further heat treatment under hydrogen at a temperature of about 400° to about 900° C. may then follow which reduces the oxide layer tht has resulted after longer storage.

In order to obtain a uniform distribution of the conductive substance in the electrode body, it is appropriate to crush or communite the voluminous and loosely cohesive product obtained by the carbonyl decomposition, and more particularly to particle sizes below one millimeter. This can be realized by crushing in conventional crushers, blade or knife cutters or other known devices which do not effect an excessive compression of the material and therewith a reduction of the specific surface.

According to a preferred embodiment of the present invention, the material is used which after the comminution or crushing passes through mesh sizes between 0.05 to 0.5 mm.

With nickel oxides or nickel hydroxides as active mass, the conductive substance is preferably made from nickel carbonyl. The electrode thereby contains preferably about 20 to about 60% by weight of the active mass, calculated with respect to $Ni(OH)_2$, in conductive substance.

By reason of the similarly of the separation or dissociation conditions, it ispossible to mix iron- and nickel-carbonyl vapor with inert gases and to carrying out the common decomposition of the carbonyls at any desired mixture ratio of the carbonyls.

This is of particular interest with the use of iron or iron-compounds as active mass where the conductive substance, in lieu of consisting of iron carbonyl or nickel carbonyl, consists with advantage of a mixture of both, which means that in iron anodes both nickel moss and also iron moss, advantageously a mixture of both carbonyls may be used as conductive substance. With the use of iron or conventional iron compounds as active mass, the electrode contains preferably about 100 to about 400% by weight of the active mass, calculated with respect to $Fe_3O_4$, in conductive substance.

According to a further preferred embodiment, the conductive substance of the present invention is coated with an electrocatalyst of conventional type.

According to still a further preferred embodiment, the active mass is admixed to the electrode material prior to the deformation, especially with the use of cobalt or cobalt compounds as active mass.

The present invention will be explained in detail by reference to the following examples which are intended only as illustrative examples but are not to be construed as limitative of the present invention.

EXAMPLE I

Nickel tetracarbonyl was evaporated by heating to a temperature of about 70° C. and the thus obtained gas was mixed with nitrogen in the volume ratio of about 1 : 20. This gas mixture was conducted with a flow velocity of 5 cm/s under normal pressure through a quartz pipe heated to 400° C. whereby within one hour, 150 g of voluminous material was obtained. This mateial was subsequently crushed in a cutter mill (rotary knife cutter) and was sifted off or screened for particles smaller than 0.2 mm; it was used as conductive substance in a nickel oxide electrode. For this purpose, 2.5 g nickel hydroxide were mixed with 0.18 g polyisobutylene, dissolved in benzene. The benzene was evaporated out a 70° C. undr normal pressure. The cake of nickel hydroxide and polyisobutylene was comminuted in a knife cutter and was carefully mixed with 1 g of the conductive substance. The thus obtained powder-like mixture was compressed under a pressure of 20 t onto a circular nickel meshwork of 4 cm in diameter and 1 mm. mesh width, which served as current conductor.

EXAMPLE II

Nickel material made as in the preceding Example I was sieved off or screened for particles smaller than 0.15 mm. and was used as conductive substance in an air electrode. For that purpose, 0.3 g of the conductive substance were mixed with 0.4 g of manganese oxide catalyst and with 5 ml of a commercially available PTFE dispersion diluted with water in the ratio of 1: 10 and the moisture was evaporated at 80° C. in a drying oven. The thus obtained cake was comminuted in a knife cutter and was applied uniformly on a round nickel grid or meshwork serving as current lead-off conductor of 4 cm in diameter and 1 mm. mesh size and compressed with a pressure of 2 t. PTFE dispersion was then again applied several times onto one side of the electrode disk until a water-repelling back layer resulted. Subsequently, the PTFE was sintered in air at a temperature of about 350° to about 370° C.

EXAMPLE III

Iron pentacarbonyl was evaported by heating to about 55° C. and the obtained gas was mixed with argon at the volume ratio of 1: 25. This mixture was conducted with a flow velocity of 8 cm/s under normal pressure through a quartz pipe heated to 450° C. whereby the heat source was moved slowly opposite the flow direction. After the separation, the obtained voluminous product was after-annealled for five hours in argon at a temperature of 500° C. The material was comminuted and sieved off or screened for particles smaller than 0.5 mm. and was used as conductive substance in an iron anode. For that purpose 1 g of the conductive substance was mixed with 1 g of magnetite and 0.8 g of polystyrene, dissolved in benzene. The mixture was pasted on an iron wire fleece of 2 cm in diameter of 0.1 g weight which served as current lead-off conductor, and the benzene was evaporated at reduced pressure. Subsequently, the electrode was compressed at 85° C. by pressing action at 1.5t.

While we have described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. In a electrode for galvanic elements including one of an active mass and an electrocatalyst, an organic binding agent, and a conductive substance. the improvement wherein said conductive substance is a comminuted form of a moss-like material of fiber-shaped crystal aggregates obtained by thermal decomposition of a gaseous carbonyl selected from the group consisting of nickel carbonyl, iron carbonyl and mixtures thereof in the presence of a non-preheated inert gas in a decomposition zone heated to about 300° to 500° C., the gaseous carbonyl being mixed with said inert gas at a ratio of 1:1 to about 1:100.

2. An electrode according to claim 1, wherein the moss like product is comminuted to particle sizes smaller than 1 mm.

3. An electrode according to claim 2, wherein said electrode contains nickel oxides or nickel hydroxides as active mass, said conductive substance being obtained from nickel carbonyl and said electrode containing about 20% to about 60% of said conductive substance based on the weight of $Ni(OH)_2$ as said active mass.

4. An electrode according to claim 2, wherein said electrode contans iron or iron compounds as active mass, said conductive substance being obtained from a mixture of iron carbonyl and nickel carbonyl and said electrode containing about 100% to about 400% of said conductive mass based on the weight of $Fe_3O_4$ as said active mass.

5. An electrode according to claim 4, characterized in that the conductive substance is freed of oxide layers in a reducing atmosphere prior to the manufacture of the electrode.

6. An electrode according to claim 2, characterized in that the conductive substance is coated with an electrocatalyst.

7. An electrode according to claim 2, characterized in that the conductive substance is mixed with cobalt or cobalt compounds as active mass.

8. An electrode according to claim 1, characterized in that the conductive substance is freed of oxide layers in a reducing atmosphere prior to the manufacture of the electrode.

9. An electrode according to claim 1, wherein said comminuted form of moss-like material passes through mesh sizes between 0.05 and 0.5 mm.

10. An electrode according to claim 1, wherein said gaseous carbonyl is introduced into said decomposition zone at atmospheric pressure and said inert gas is introduced into said decomposition zone at room temperature.

11. A loosely cohesive, voluminous, moss-like material of fiber-shaped crystal aggregates formed by thermally decomposing a carbonyl gas selected from the group consisting of nickel carbonyl, iron carbonyl and mixtures thereof in an admixture with a non-preheated inert gas at atmospheric pressure and at a temperature of at least about 300° C.

12. The material of claim 11, wherein said inert gas is at room temperature prior to decomposition of said carbonyl gas.

13. The material of claim 12, wherein said decomposition is effected at a temperature of about 300° to 500° C. with the carbonyl gas being mixed with said inert gas at a ratio of 1:1 to about 1:100.

14. In a electrode for galvanic elements including one of an active mass and an electrode catalyst, an organic binding agent and a conductive substance, the improvement wherein said conductive substance is obtained by passing a mixture of an unpreheated inert gas and a metal carbonyl gas selected from the group consisting of nickel carbonyl, iron carbonyl and mixtures thereof at atmospheric pressure through a reaction vessel heated to a decomposition temperature of at least about 300° C. so that a decomposition product of said metal carbonyl comprising a loosely cohesive, large-volume, moss-like material of fiber-shaped crystal aggregates is formed on the walls of said reaction vessel, recovering said decomposition product from said reaction vessel, and comminuting said decomposition product to form particles having particle sizes of less than 1 mm.

15. The electrode of claim 14, wherein said reaction vessel is heated to a temperature of 300° to 500° C.

16. The electrode of claim 14, wherein the ratio of said metal carbonyl to said inert gas in said reaction vessel is 1:1 to 1:100.

17. The electrode of claim 16, wherein said ratio is 1:15 to 1:30.

18. The electrode of claim 16, wherein the temperature of all unpreheated gas is room temperature.

19. The electrode of claim 14, wherein said reaction vessel is heated by a heat source, said heat source being moved along said reaction vessel in a direction opposite the flow direction of said metal carbonyl gas and said unpreheated inert gas through said reaction vessel.

20. The electrode of claim 14, wherein obstacles are provided in said reaction vessel, sad obstacles being composed of said decomposition product, whereby additional amounts of decomposition product produce by the decomposition of said metal carbonyl grow on said obstacles.

21. The electrode of claim 14, wherein the particles of said decomposition product pass through mesh sizes between 0.05 to 0.5 mm.

22. A method for producing a conductive substance for use in electrodes for galvanic elements, comprising the steps of evaporating a material selected from the group consisting of nickel carbonyl, iron carbonyl and mixtures thereof to produce a carbonyl gas, mixing the carbonyl gas obtained thereby with an inert gas having undergone no preheating when mixed with said carbonyl gas, and causing the gas mixture to undergo thermal decomposition by conducting the gas mixture at atmospheric pressure to a decomposition zone heated to the decomposition temperature of said carbonyl gas whereby the growth of crystals one upon the other into a voluminous product comprising a moss-like material of fiber-shaped crystal aggregates is attained and thereafter comminuting the voluminous product obtained from the decomposition zone into particle size smaller than 1 mm.

23. A method according to claim 22, characterized in that the inert gas is at room temperature.

24. A method according to claim 16, further comprising the step of mixing the comminuted material with an active mass for an electrode.

25. A method according to claim 24, further comprising the step of liberating the conductive substance from oxide layers in a reducing atmosphere prior to manufacture of the electrode.

26. A method according to claim 22, further comprising the step of coating the conductive substance with an electrocatalyst.

27. A method according to claim 24, characterized in that the active mass is selected from the group consisting of cobalt and cobalt alloys.

* * * * *